United States Patent [19]

Nelson et al.

[11] Patent Number: 4,673,165
[45] Date of Patent: Jun. 16, 1987

[54] WEED PULLER

[76] Inventors: Ralph F. Nelson, 10277 Sweet Creek Rd., Mapleton, Oreg. 97453; Donald S. Stephen, 9812 SE. 33rd, Milwaukie, Oreg. 97222

[21] Appl. No.: 851,959

[22] Filed: Apr. 14, 1986

[51] Int. Cl.$^4$ .............................................. B66F 3/00
[52] U.S. Cl. .................................. 254/132; 294/50.8
[58] Field of Search ............... 254/132; 294/50.6, 50.8

[56] References Cited
U.S. PATENT DOCUMENTS

| | | | |
|---|---|---|---|
| 73,482 | 1/1868 | Woodworth | 254/132 |
| 849,654 | 4/1907 | Bennett | 254/132 |
| 2,016,640 | 10/1935 | Lehota | 254/132 |
| 2,663,543 | 12/1953 | Moseley | 254/132 |

*Primary Examiner*—Frederick R. Schmidt
*Assistant Examiner*—Steven P. Schad
*Attorney, Agent, or Firm*—John F. Ingman

[57] ABSTRACT

A weed puller is provided which comprises a handle to which are separately attached two (2) rotating, weed grasping prongs. The lower, or ground penetrating, portion of each prong is offset from the top portion thereof, so that when the prongs are rotated about their individual separate vertical axes at the handle, the lower portions of the prongs approach each other in parallel orientation so as to grasp the weed and its roots with essentially evenly applied pressure. The prong rotation is achieved through outward movement of upper ends of the prongs in camming slots formed in a camming member. Such movement is created by pivoting the handle of the weed puller, with the prongs inserted in the ground astraddle the weed, toward an outwardly extending lever member which is rotatingly attached along a horizontal axis at the lower end of the handle, and is rigidly connected to or an extension of the camming member. Continued pivoting of the handle leverages the grasped weed from the ground. An enlarged lever end may be used to provide a broader pivot base and, by its weight, to bias the prongs to maximum separation prior to insertion into the ground.

4 Claims, 3 Drawing Figures

WEED PULLER

BACKGROUND OF THE INVENTION

1. Field of the Invention

The present invention generally relates to devices for the pulling of weeds from the lawn, garden, or other such surface, and more particularly, is concerned with a leveraged weed extractor which applies substantially even pressure along the length of the weed-grasping prongs.

2. Description of the Prior Art

A number of devices have been designed for the removal of various weeds, especially dandelions, from undesired locations, such as lawns and gardens. Some weed removal devices employ a manner of cutting the weed roots beneath the ground surface; others attempt to grasp and pull out the roots along with the weed. The latter method is at least theoretically superior, for if the roots are extracted completely, the weed will not be regenerated. However, a common deficiency exists with such weed-pulling devices: their design involves the pivoting of one jaw member so that the jaws grasp the main root of the weed most strongly at only a single place, that location on the root thus being crushed and weakened so that it becomes the point where the root tends to break off, leaving the remainder of the root in place for regeneration.

There exists a need for a weed puller which is easy to operate, utilizes leverage to grasp and remove the weed with roots, and applies a substantially uniform grasp on the main roots so as to minimize concentration of pressure and thus avoid the establishment of a root "breakpoint" in the extraction process.

SUMMARY OF THE INVENTION

The present invention provides a weed puller which is designed to satisfy the aforementioned needs. The invention embodies a handle with attached prongs which rotate so as to grasp the weed and its roots between parallel ground penetrating portions of the prongs. The grasping rotation of the prongs is produced by a camming action which is created as the handle is pivoted relative to the ground surface. Continued movement of the handle in the same direction provides leveraged removal of the weed and its roots from the ground.

Accordingly, the present invention provides a weed puller which comprises a handle to which are separately attached two (2) rotating, weed grasping prongs. The lower, or ground penetrating, portion of each prong is offset from the top portion thereof so that when the prongs are rotated about their individual separate vertical axes at the handle, the lower or ground penetrating portions of the two prongs approach each other in parallel orientation. The lower portions of the prongs thus coming together grasp the offending weed and roots with essentially evenly applied pressure. The prong rotation is achieved through movement of upper ends of the prongs in camming slots formed in a camming member. Such movement is created by pivoting the handle of the weed puller, with the lower portion of the prongs having been previously inserted vertically into the ground straddling the offending weed, toward an outwardly extending lever member which is rotatingly attached along a horizontal axis at the lower end of the handle assembly and is rigidly connected to or an extension of the camming member. Since movement of the lever member, and thus the camming member, is physically restricted by the extended end of the lever member pressing against the ground surface, movement of the handle and prongs with respect to the lever member will cam the upper ends of the prongs outward in the camming member and thus rotate the lower portions of the prongs together in a parallel manner to grasp the weed and its root evenly. Continued pivoting of the handle in the same direction about the extended end of the lever member provides leverage to extract the grasped weed from the ground, where it is removed from the prongs and disposed of. An enlarged lever end, in cylinder or other form and normally of solid material, may be attached at the extended end of the lever member. This enlarged lever end serves two purposes: it provides a broader pivot base on the ground surface against which to rotate the handle of the weed puller, and it acts as a weight to assure that the lever member automatically swings to its lowest position, therefore holding the prongs at maximum separation prior to insertion of the lower prong ends into the ground.

DESCRIPTION OF THE PREFERRED EMBODIMENT

Figure 1:
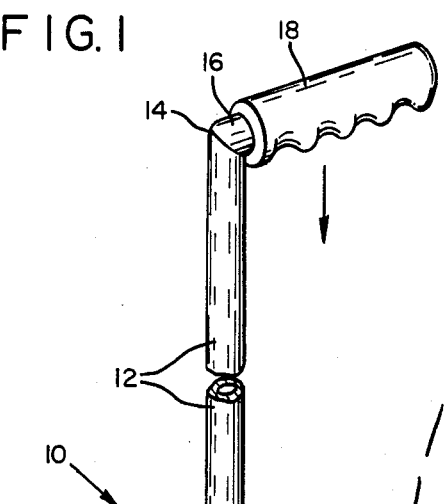
FIG. 1 illustrates the weed puller in perspective, as it is being lowered over a weed.

Referring now to the drawings, and more particularly to FIG. 1, there is shown in perspective the preferred embodiment of the weed puller 10. In use, a handle 12 extends upwards approximately 2½ feet to handle junction 14 where an attached right angle extension 16 or a sharp bend (not shown) form the base for a handlegrip 18. The handlegrip 18 provides a hand conforming grip for pushing the weed puller 10 down into the ground, and for pivoting the handle 12 and leveraging the grasped weed from the ground, as will be described later.

In the preferred embodiment, attached, by welding or possibly formed therewith, to the lower end of the handle 12 on its periphery are two (2) prong sleeves 20 which are preferably attached in parallel to the longitudinal axis of handle 12 and symmetrically about the plane formed by the handle 12 and the handlegrip 18, so that the sleeves 20 are approximately 90 degrees apart on the circumference of the handle 12. Within each of the paarallel sleeves 20 rotates a prong member 22, the axes of rotation 24 of the two (2) prong members 22 thus being parallel. Each prong member 22 has a lower or ground penetrating end 26, and an upper end 30. The lower or ground penetrating end 26 of each prong member 22 is substantially parallel to but offset from its axis of rotation 24, as is shown in the figures. A lower stop 32 and an upper stop 34 are welded or otherwise attached to the prong member 22 just below and just above where the sleeve 20 encircles the prong member 22, so that the stops 32 and 34, in conjunction with the sleeve 20, serve to limit the movement of the prong member 22 to rotation within the sleeve 20. Attached to or continuing through the upper stop 34 is the upper end 30 of the prong member 22, which is also offset from the axis of rotation 24, as was the lower end 26. The upper end 30, in the preferred embodiment initially extends perpendicular to the rotational axis 24 and then bends approximately 90 degrees upwards, the upper end 30 being generally in the same plane as the lower offset ground penetrating end 26.

While the above manner of rotatably attaching the prong members 22 to the lower end of the handle 12 is preferred due to its ruggedness and durability, other means of rotatable attachment of prong member 22, wherein the lower, ground penetrating end 26 and the upper end 30 are offset from the axis of rotation 24, would also prove to be satisfactory and with in the scope of this invention. Included would be the joining of the upper end 30 and the lower, ground penetrating end 26 by an essentially horizontal section of the prong member 22 wherein the place of rotating attachment to the handle 12, and thus the axis of rotation 24, is located at a point along such intermediate section, so that the ends 26 and 30 are offset therefrom.

In the preferred embodiment, fixedly attached, as by welding, to the lower end of the prong sleeves 20 and handle 12 is a horizontal sleeve 36 which defines a horizontal rotational axis 38 on which pivots a lever member 42. The lever member 42 thus extneds outward from the bottom of handle 12. The lever member 42 may have a slight intermediate downward bend 44 following which on the end 46 of the lever member 42 there may be attached an enlarged lever end, perferably a lever end cylinder 48, normally a solid piece of metal which serves as both a broadened pivot base and a weight, as will be noted later. Intermediate to the horizontal rotational axis 38 and bend 44 of the lever member 42 is attached perpendicularly an upwardly extending connecting member 50 which serves to rigidly connect the lever member 42 to the camming plate 52. The camming plate 52, also perpendicularly attached to the connecting member 50, is therefore approximately parallel to that portion of the lever member 42 near to the handle 12. In the camming plate 52 are two (2) camming slots 54 which, in the preferred embodiment, are approximately 1⅞ inch long and which diverge at approximately a 60 degree angle, into which the upper ends 30 of the prong members 22 are slidably fitted. Variation in the length of the camming slots 54, and the angle of divergence between them is acceptable, as will be recognized by the person skilled in the art.

Other configurations of camming member 52 and lever member 42 would also be satisfactory, the above description only providing a preferred embodiment. Any manner of formation of a camming member and a lever member which together are attached to a horizontal axis of rotation at the lower end of the handle so as to engage the upper ends of the prong members in camming slots, and which also extends outward from the axis of attachment at the handle so as to provide a pivot point on the ground surface, falls within the scope of this invention. Specifically included would be a camming member and lever member formed as a single piece, wherein the camming member portion is directly attached at the horizontal axis of rotation, and the lever member portion is an extension from the camming member.

Figure 2:
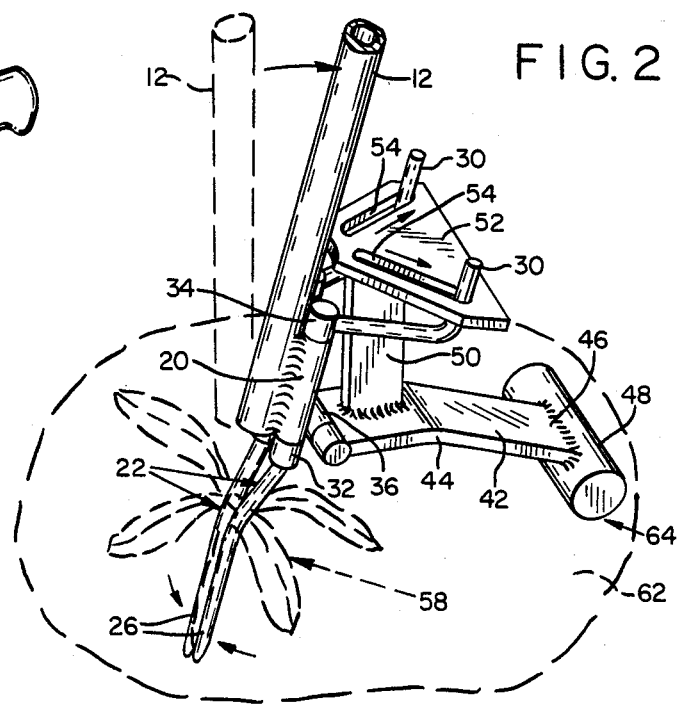
FIG. 2 shows an enlarged view of the lower portion of the weed puller, illustrating the prongs and camming position as the weed with its roots are grasped.
Figure 3:
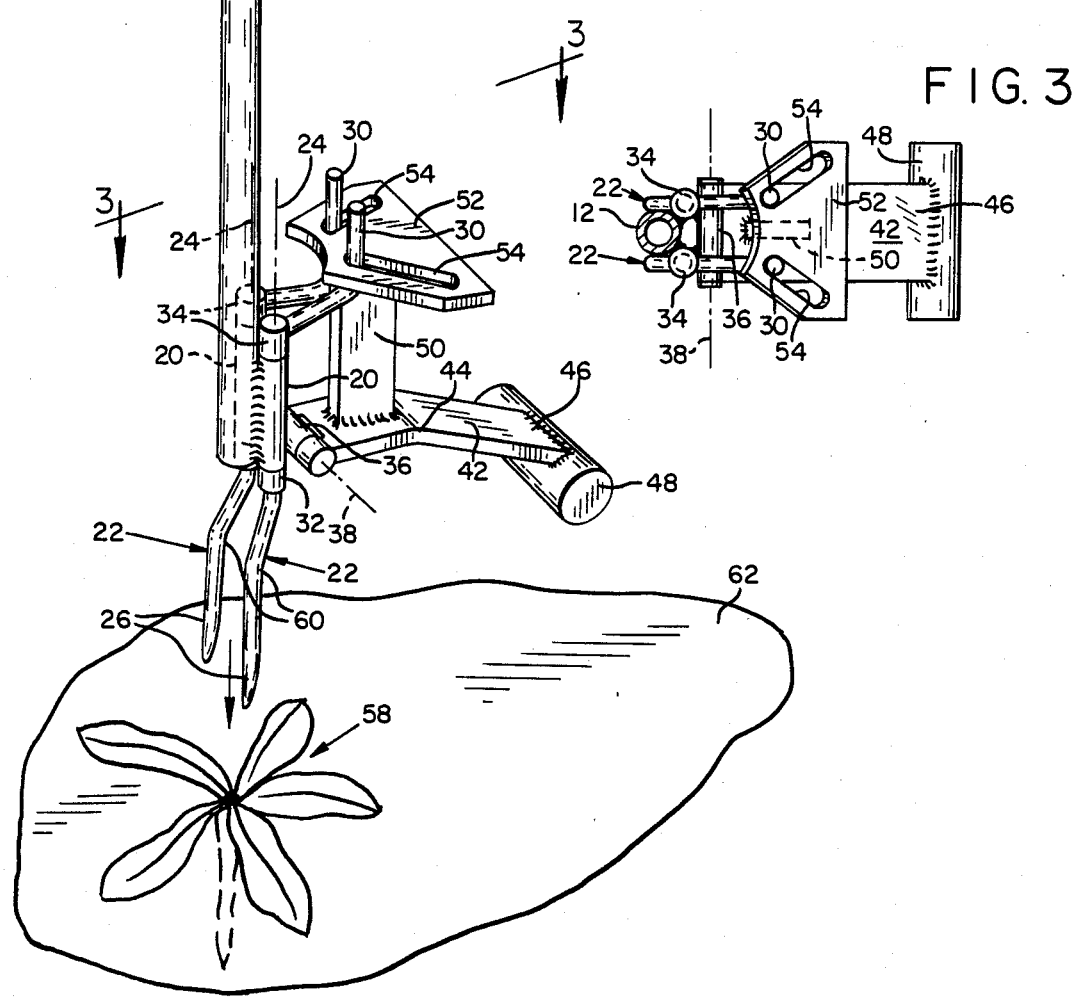
FIG. 3 shows a top sectional of the weed puller of FIG. 1 along the line 3—3.

A description of the operation of the weed puller 10 will illustrate the simplicity and effectiveness of the device. Upon locating a weed 58 in an undesired location, the user takes the weed puller 10 and locates the sharpened prong ends 26 immediately above and straddling the center portion of the weed 58 with the handle 12 oriented substantially in a vertical position. At this point the weed puller 10 will appear essentially as it does in FIG. 1. The weed puller 10 then is pushed directly downward, utilizing the handlegrip 18 affixed to the horizontal extension 16 of the handle 12. The lower prongs 26 will easily enter the ground straddling the center of the weed 58 up to the first bend 60 of the prong members 22, with the lever end cylinder 48 resting on, or in close proximity to the ground 62. Now referring to FIG. 2, the handle 12 has been pulled in the direction of the extending lever member 42. The location of the lever end cylinder 48 at the end 46 of the lever member 42 being supported by the ground 62, the pulling of the handle 12 will initially move the handle 12 and prong members 22 with relation to the lever member 42 and camming plate 52, as illustrated. The movement will cause the upper ends 30 of the prong members 22 to move in the camming slots 54 and therefore to cam outwards, thus forcing the lower prongs 26 to rotate inwards towards each other. The parallel lower ends 26, rotating on parallel axes 24 come together in an even manner, thus gripping the offending weed 58 and its roots with a uniform pressure. Continued rotation of the handle 12 towards the lever end cylinder 48 will, while keeping a tight grasp on the weed 58, pivot the device about that cylinder 48 on the ground, thus providing leveraged extraction of the weed from the ground.

It is thought that the weed puller of the present invention and its many attendant advantages will be understood from the foregoing description and that it will be apparent that various changes in form, construction and arrangement of the parts thereof may be made without departing from the spirit and scope of the invention or sacrificing all of its material advantages, the form hereinbefore described being merely an exemplary embodiment thereof.

We claim:

1. A weed puller, which comprises:
   (a) a handle member, having an upper end and a lower end;
   (b) two prong members, each separately and rotatably attached to the said handle member near the said lower end of the said handle member, the said attachment formed to permit each said prong member to rotate about a separate axis of rotation, these said axes of rotation being fixed parallel to each other and to the longitudinal axis of the said handle member at all times during use;
   said prong members each having a lower, ground penetrating end which extends downward, and an upper end which extends generally upward, the said lower, ground penetrating end and the said upper end being offset from each other, and the said axes of rotation of the said prong members at the said attachment to the said handle member being located intermediate the said lower, ground penetrating end and the said upper end;
   (c) a camming member, rotatably connected to the said handle member at the lower end of the said handle member about an axis transverse to the longitudinal axis of the said handle member, and located at the lower end of the handle member, which camming member extends above the said transverse axis of said rotatable attachment, and wherein said camming member is formed two diverging camming slots into which are slidingly positioned the said upper ends of the said prong members;

(d) a lever member, also rotatably attached, in cooperation with said camming member, about the said transverse axis of rotation, to the said lower end end of the said handle member, said lever member extending outward away from said handle member, said lever member being rigidly fixed to the said camming member, and having an outer end;

(e) so that, with the said lower, ground penetrating end of the said prong members inserted vertically in the ground straddling the unwanted weed, pivoting the vertical said handle member about the horizontal said transverse axis towards the said outer end of the said lever member will move the said upper ends of the said prong members with respect to the said camming member and its camming slots, such movement causing the said upper ends of the said prong members to be cammed outwards away from each other within the said camming slots, such outward rotation of the said upper ends of the said prong members translating through the rotation of the said prong members to an inward rotation of the said lower, ground penetrating ends towards each other in parallel manner, so as to grasp the weed and its root;

and continued pivoting of the said handle member towards the said outer end of the said lever member will pivot the weed puller about said outer end on the ground surface and thereby extract the weed grasped between the lower ends out of the ground.

2. A weed puller, which comprises:

(a) a handle member, having an upper end and a lower end;

(b) two prong members, each separately and rotatably attached to said handle member near the said lower end of the said handle member, which attachment provides separate, fixed axes of rotation for the said prong members, which said axes of rotation are, at all times during use, parallel to the longitudinal axis of said handle member;

each said prong member having three parts: a lower, ground penetrating end which extends downward, and is offset from the said axis of rotation of said prong member, a middle section whereat the said prong member is rotatably attached to said handle member near the lower end of the handle member and whose longitudinal axis is coincident with the said axis of rotation of the prong member, and an upper end which extends generally upward and which is offset from the said middle section, and also is offset from the said lower, ground penetrating end of the said prong member;

(c) a lever member, having two ends, one end of which is rotatably attached to the handle member at its lower end about an axis transverse to the longitudinal axis of the handle, and the other and outer end extending outward from the handle member;

(d) a connecting member rigidly attached normal to the lever member and extending upwards therefrom; and (e) a camming plate member attached atop the connecting member so as to form a rigid, substantially parallel configuration with the lever member;

said camming plate member being formed with two diverging camming slots wherein slidably fit the said two upper ends of the said prong members;

(f) so that, with the lower, ground penetrating end of the prongs inserted vertically in the ground straddling the unwanted weed, pivoting the vertical said handle member about the horizontal said transverse axis towards the said outer end of the said lever member will move the said upper ends of the said prong members with respect to the said camming plate member and its said camming slots, such movement causing the said upper ends of the said prong members to be cammed outwards away from each other within the said camming slots, such outward rotation of the said upper ends of the said prong members translating through the rotation of the said prong members to an inward rotation of the said lower, ground penetrating ends towards each other in a parallel manner, so as to grasp the weed and its root;

and continued pivoting of the said handle member towards the said outer end of the said lever member will pivot the weed puller about said outer end of the said lever member on the ground surface and thereby extract the weed grasped between the lower prong ends out of the ground.

3. A weed puller, as recited in claim 2, wherein the said separate and rotatable attachment of the said two prong members on axes parallel to the said longitudinal axis handle member is by means of two separate sleeves, which are oriented parallel to the said longitudinal axis of the handle member and encompass the said middle sections of the said two prong members, both of the said sleeves being fixedly attached to the said handle member with their longitudinal axes parallel to the longitudinal axis of the said handle member, and thus parallel to each other.

4. A weed puller, as recited in claim 3, wherein the said handle member, at its said upper end, has a handle extension oriented perpendicular to the longitudinal axis of the said handle member, the said handle member and said handle extension forming a plane;

wherein the said two separate sleeves for the said rotatable attachment of the said prong members to the said handle member, the said camming plate member and the said lever member all are cooperatively positioned on said handle member symmetrical about the said plane formed by the said handle member and said handle extension.

* * * * *